UNITED STATES PATENT OFFICE.

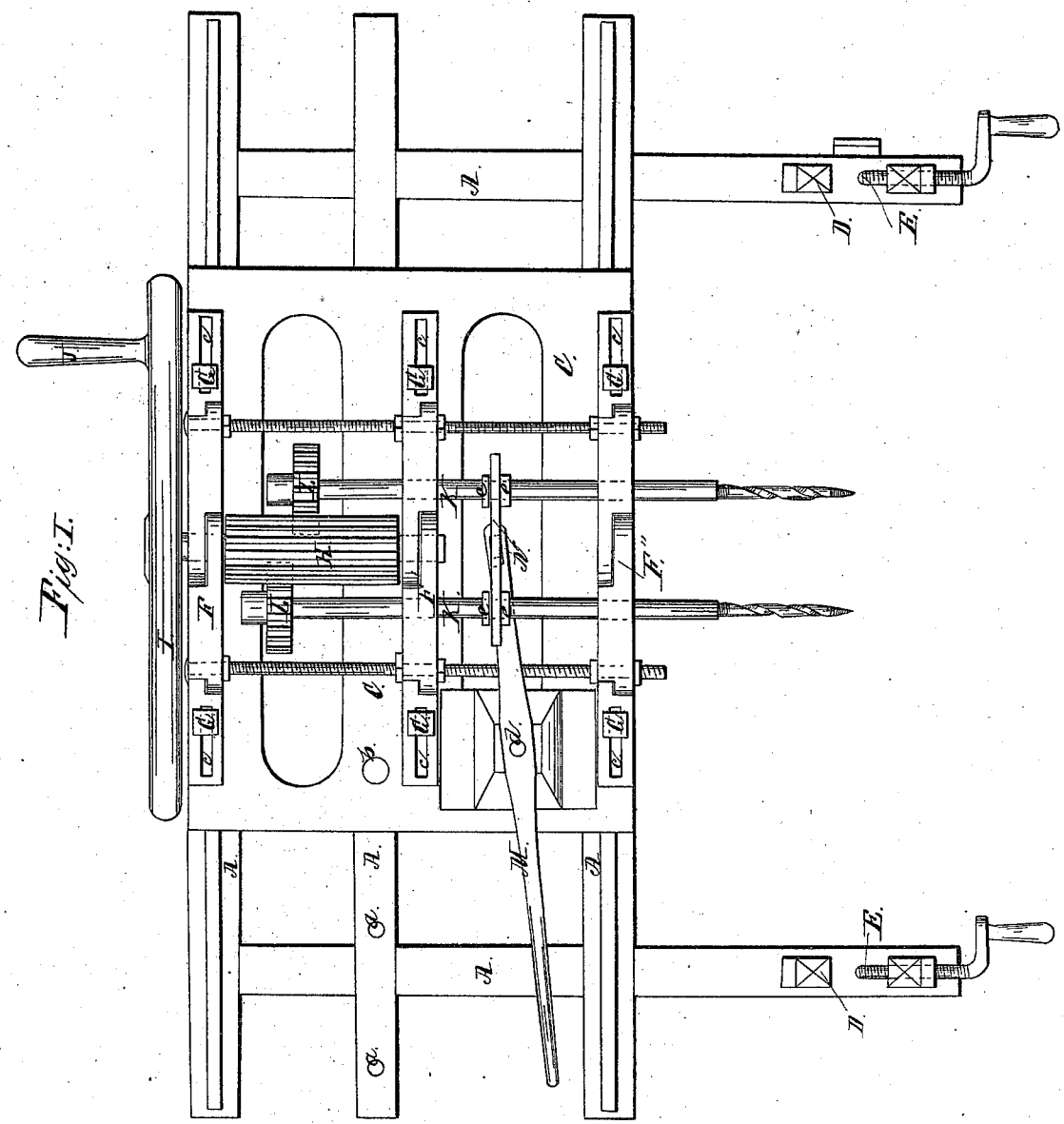
J. Temple,
Boring Fence Posts.
N° 12,808.   Patented May 1, 1855.

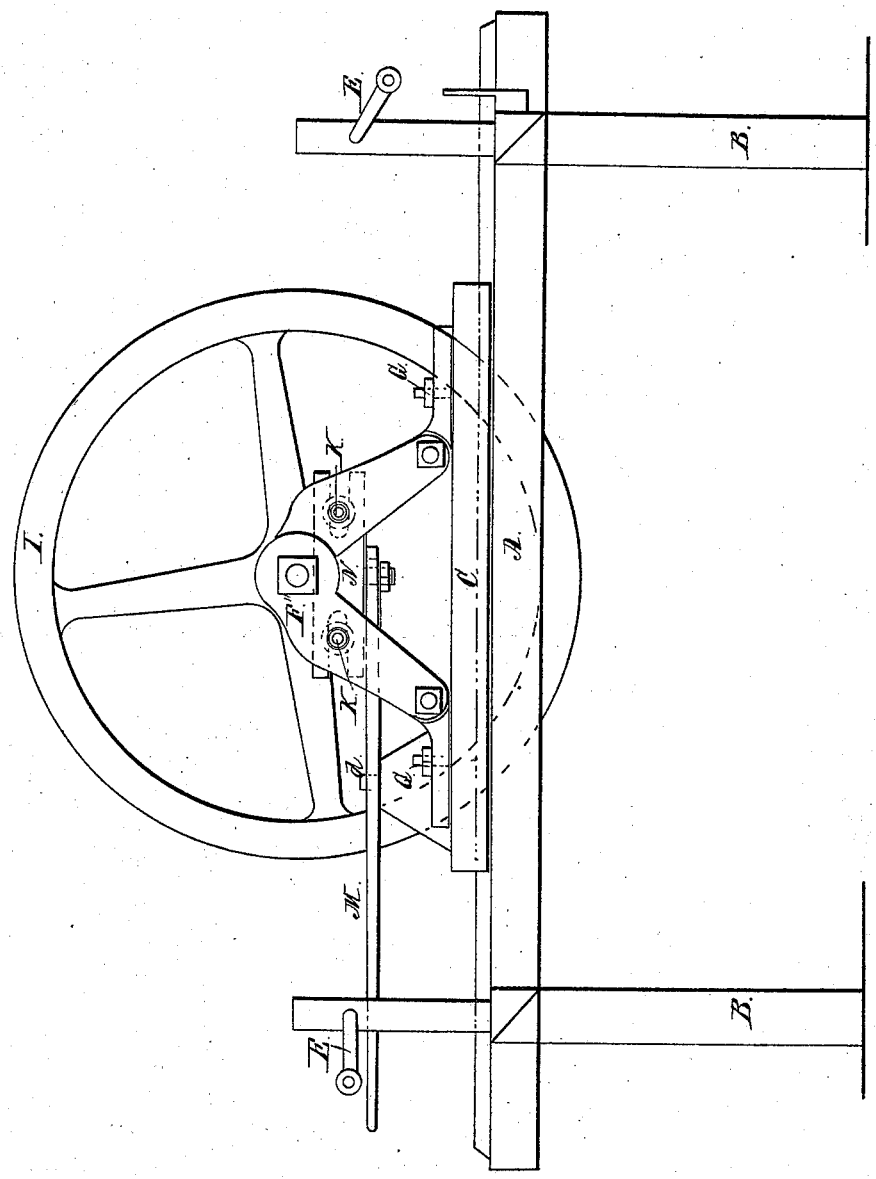

JAMES TEMPLE, OF BIRMINGHAM, PENNSYLVANIA, ASSIGNOR TO ISRAEL WARD AND JAS. TEMPLE.

MACHINE FOR BORING FENCE-POSTS.

Specification of Letters Patent No. 12,808, dated May 1, 1855.

*To all whom it may concern:*

Be it known that I, JAMES TEMPLE, of Birmingham, in the county of Huntingdon and State of Pennsylvania, have invented certain new and useful Improvements in Machines for Boring Holes in Fence-Posts; and I do hereby declare the following to be a full, clear, and exact description of the same, reference being had to the accompanying drawings, making a part thereof, in which—

Figure 1, represents a top view, and Fig. 2, represents a view from one of the sides. Similar letters in both the figures denote like parts.

The nature of my invention consists, in hanging the long pinion which gives motion to the augers through the spur wheels on their shanks, and the shanks of the augers, in adjustable bolsters or pillar blocks, so that the augers may be set farther apart, or nearer together, to bore the holes at variable distances, without allowing their spur wheels to be out of gear with said long pinion.

To enable others skilled in the art to make and use my invention, I will proceed to describe the same with reference to the drawings.

A, A, A, is a horizontal frame supported upon legs B, B, and on said frame is a sliding carriage C, upon which the main part of the machine is supported. The middle longitudinal piece of the frame is pierced with holes $a$, $a$, in any suitable number, and at distances apart to correspond with the usual distance between the ordinary post holes, and a pin $b$, passing through the carriage C, holds said carriage at the point desired to work the augers. The post to be bored is held against the standards D, by the screw rods E.

Upon the carriage C, are arranged three bolsters or pillar blocks F, F', F''. These pillar blocks have a rule joint at their apex (as seen in Fig. 2, more particularly) and their bases where they rest on the carriage C, are slotted as seen at $c$. A set screw G passes through the carriage and through these slots, so that the bolsters may be spread at the bottom and consequently be lowered in height, and when adjusted at the proper height, are made fast by the set screws.

H, is a long pinion provided with suitable cogs or teeth, and its journals or shaft have their bearings in the bolsters F, F'. On the outside journal of the long pinion, is arranged a balance wheel I, having a handle J in it, which serves the purpose of crank and balance wheel.

In the bolsters F', F'', are supported the auger shanks K, K, each of them having on their inner ends, spur wheels L, L, which mash with and receive their motion from the long pinion H. As the bolsters are lowered by spreading out their bases, the spur gears roll around the periphery of the long pinion which lowers with the bolsters, but still remain in gear with said pinion, the distance between their respective journals and the journal of long pinion not changing. But as the bolsters are lowered the spur gears spread out, and thus spread farther from each other the augers. By raising the bolsters, the reverse adjustment is had, and thus mortises of any desired length, or at any suitable distance apart may be bored on the same machine.

M is a lever, pivoted at $d$, at about its center and connected at its extreme end to a crosshead N which is restrained by collars $e$ $e$, on the shanks of the augers. When the post is clamped and motion given to the machine, the operator takes hold of the lever M, and forces up the augers into the post, the spur wheels on their shanks sliding on the long pinion, but at the same time they are rotated by it. When the augers have bored through the post, the motion of the lever is reversed and they are run back for the next operation, after the carriage has been shifted to the next set of holes to be bored.

Having thus fully described the nature of my invention what I claim therein as new and desire to secure by Letters Patent, is—

The supporting of the long pinion and the auger shanks in the adjustable hinged pillar blocks, such as described, so that the augers may be set to bore holes at variable distances apart, whilst the spur wheels on their shanks shall still keep in gear with the long pinion as described.

JAMES $\overset{\text{his}}{\times}$ TEMPLE,
mark.

Witnesses:
A. B. STOUGHTON,
THOMAS H. UPPERMAN.